UNITED STATES PATENT OFFICE.

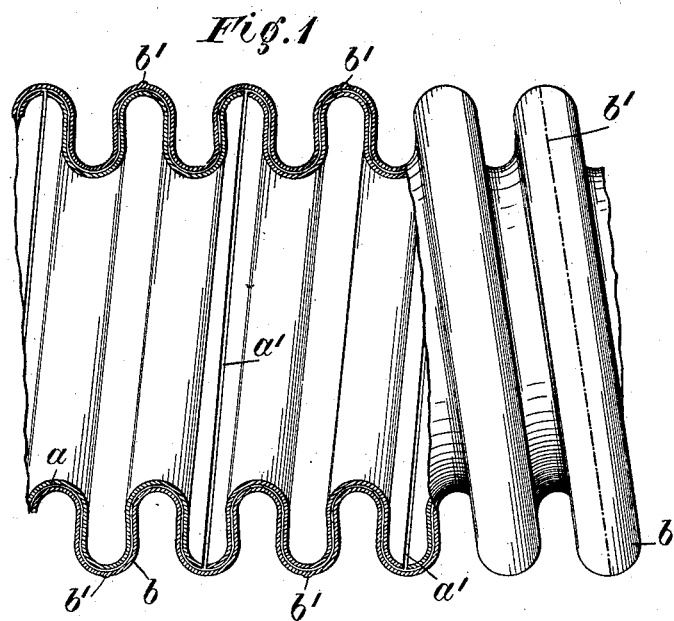
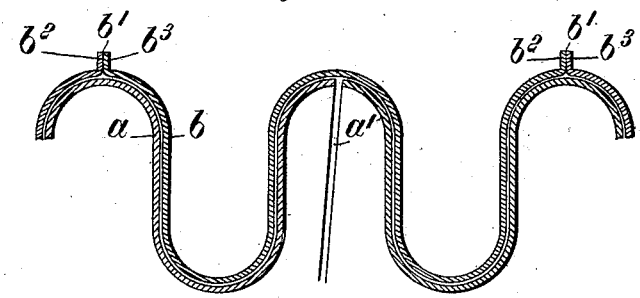

EMIL WITZENMANN, OF PFORZHEIM, GERMANY.

FLEXIBLE METAL HOSE.

1,424,057. Specification of Letters Patent. Patented July 25, 1922.

Application filed April 29, 1921. Serial No. 465,515.

*To all whom it may concern:*

Be it known that I, EMIL WITZENMANN, a citizen of the republic of Germany, residing at Pforzheim, Germany, have invented certain new and useful Improvements in Flexible Metal Hose; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

The object of the present invention is a flexible metal hose formed in a manner known per se by winding a metal band of corrugated cross-section into the shape of a cylindrical spiral and by welding the adjacent edges of the windings of the band.

According to the invention the hose consists of two separate hose arranged one inside the other, the outer of the hose being spiral welded and the inner being only loosely wound, i. e. the adjacent edges of the windings being not joined to each other, the cross-sections of the metal bands out of which the two hose are formed having the same or substantially the same shape so that the corrugations of the inner hose lie snugly in the corrugations of the outer hose.

By this means the welded outer hose is reinforced along its inner surface by the inner hose whereby hose manufactured according to the invention may be subjected to considerable strains in any direction without having to fear that an overstraining resulting in a permanent deformation occurs and an excellent resiliency is imparted to hose of this type and the elasticity of the hose is continuously maintained.

A constructional example of a hose according to the invention is shown on the accompanying drawings in which:

Fig. 1 illustrates a hose in a longitudinal section and partly in view;

Fig. 2 is a longitudinal section on an enlarged scale.

$a$ denotes the metal band wound into the shape of a cylindrical spiral and forming the inner hose, the adjacent edges of the windings forming a gap at $a'$. The hose $a$ is inserted in the outer hose formed by the similarly wound band $b$ the adjacent edges of the windings being joined together by welding at $b'$.

The metallic band $b$ forming the outer hose is preferably a steel band, but a band of another metal may be used for making the outer hose as well as the inner hose.

For the purpose of joining the adjacent edges of the windings of the outer hose, the edges may be shaped to form flanges $b^2$, $b^3$ as shown in Fig. 2 and the two adjacent flanges may then be welded together.

It is evident that the seam $a'$ of the inner tube can be closed by loose folding or by another flexible joint, but the open gap has proved very satisfactory.

The manufacture of the hose can be carried out in such a manner that both hose are wound, whereupon the inner hose is inserted into the outer hose and the spiral seams of the latter are then welded.

I claim:

1. A flexible metal hose, consisting of two single hose one arranged inside the other and each formed by winding a metal band of a similar corrugated cross-section into the shape of a cylindrical spiral, the adjacent edges of the windings of the band forming the outer hose being joined by welding and the edges of the inner hose being adapted to be displaced relatively to each other.

2. A flexible metal hose, consisting of an outer hose formed by winding a metal band of a corrugated cross-section into the shape of a cylindrical spiral and joining the spiral seams by welding, and an inner hose inserted in the outer hose and formed by winding a metal band of corrugated cross-section that corresponds to the cross-section of the band forming the outer hose, the adjacent edges of the windings of said inner hose being separated by a gap.

In testimony that I claim the foregoing as my invention, I have signed my name.

EMIL WITZENMANN.

Witnesses:
 OTTO MEYER-RELLER, Ing.
 ADOLF WITZENMANN.